United States Patent [19]

Gabriele

[11] Patent Number: 4,531,868
[45] Date of Patent: Jul. 30, 1985

[54] BROACHING MACHINE

[75] Inventor: Leonard A. Gabriele, Warren, Mich.

[73] Assignee: Lear Siegler, Inc., Santa Monica, Calif.

[21] Appl. No.: 340,883

[22] Filed: Jan. 19, 1982

[51] Int. Cl.³ .................. B23D 37/00; B65G 15/64
[52] U.S. Cl. .................... 409/269; 51/215 H;
    198/345; 414/224; 409/244; 409/252; 409/271;
    409/274; 409/277
[58] Field of Search ............ 409/6, 244, 245, 250,
    409/252, 256, 257, 259, 269, 270, 271, 274, 276,
    277, 278; 198/345, 436, 457, 747; 414/222, 224,
    749; 51/215 CP, 215 H

[56] References Cited

U.S. PATENT DOCUMENTS

| | | | |
|---|---|---|---|
| 1,318,485 | 10/1919 | Donaldson | 409/252 |
| 1,961,928 | 6/1934 | Hart | 409/252 |
| 2,008,208 | 7/1935 | Hart | 409/277 |
| 2,225,731 | 12/1940 | Averill | 409/250 |
| 2,237,058 | 3/1941 | Nutt | 198/345 |
| 2,687,203 | 9/1954 | Ladewig | 198/457 |
| 2,989,993 | 6/1961 | Osmond et al. | 198/436 |
| 3,897,715 | 8/1975 | Holstein | 409/269 |

Primary Examiner—Z. R. Bilinsky
Assistant Examiner—Daniel Howell
Attorney, Agent, or Firm—Barnes, Kisselle, Raisch, Choate, Whittemore & Hulbert

[57] ABSTRACT

A high production surface broaching machine, in which a plurality of parts are located and clamped simultaneously in broaching position, broached, and simultaneously unclamped and discharged into an outchute. The plurality of parts are moved horizontally into position below the broaching position, and are then raised into accurately located broaching position against horizontal locating and ejection bar means. After broaching, the bar means pushes the broached parts down into laterally open recesses in an elongated bar, which is then moved longitudinally relative to a cam which guides the parts out of the recesses into an outchute.

10 Claims, 6 Drawing Figures

BROACHING MACHINE

BRIEF SUMMARY OF THE INVENTION

The present invention is a high production broaching machine for surface broaching a plurality of parts simultaneously. The machine is fully automatic and requires only that a continuous supply of parts is advanced in an inchute.

For purposes of illustration, the machine is designed to broach a plurality of oil grooves in the end surfaces of parts which have a stem provided with a flat head at one end. It will be apparent that instead of broaching two parts at a time, any reasonable number may be broached, and the shape of the parts may be quite different.

The machine is fully automatic and the moving parts are actuated by piston and cylinder devices. As is customary in automatic machines, sequencing and control of the steps in the operation is normally by valve controlling switches which are sequenced by sensing completion of one step of the operation to initiate another step. Some steps are performed simultaneously or with overlapped timing, to increase the rate of production. Since this type of machine control is well known in the art, no attempt is made herein to disclose details of all of the electric and hydraulic systems, although some of the piston and cylinder devices and some of the condition responsive switches and switch actuators are adverted to, where convenient.

Described in general terms, the specific machine disclosed herein is provided with an inclined inchute, in which a continuous series of work pieces or parts is advanced to locate the leading pair of parts in preliminary loading position with the first part of the pair against a stop. Feed means are provided to engage the leading pair of parts and advance them horizontally toward an intermediate position directly below the position in which the parts are broached. In practice, the pair of parts, which were in edge abutment initially are guided along divergent paths so as to separate the parts. As shown, a number of parts are advanced along each path in tandem. The leading pair of parts is loosely located in pockets formed at one side of a loading and unloading bar. At this time clamps are elevated from below the parts and engage the underside of the heads or disks at the upper end of the parts and raises them into accurately formed nests in locators which engage the peripheries of the disks. The clamps for these particular parts are upwardly open cups, and press the parts into firm engagement with locating and ejection bars which control the vertical position of the parts, and hence the depth of cut performed by the elongated, horizontally movable broaches.

After the broaches have finished the cutting stroke, the ejection bars are moved downwardly, which moves the finished parts out of the locators and back into the lateral recesses in the unloading bar. The unloading bar is then traversed longitudinally, and the finished parts are cammed out of the pockets or recesses in the unloading bar and into the outchute.

As soon as the finished parts have been lowered out of the locators, the broaches are returned to initial position. The loading and unloading bar is returned to position to receive the next pair of parts, and as soon as it is in position, the feeder advances the leading pair of parts from the inchute, thereby advancing the tandem series of parts to position another pair of parts in the pockets of the loading and unloading bar.

DETAILED DESCRIPTION

Figure 4:
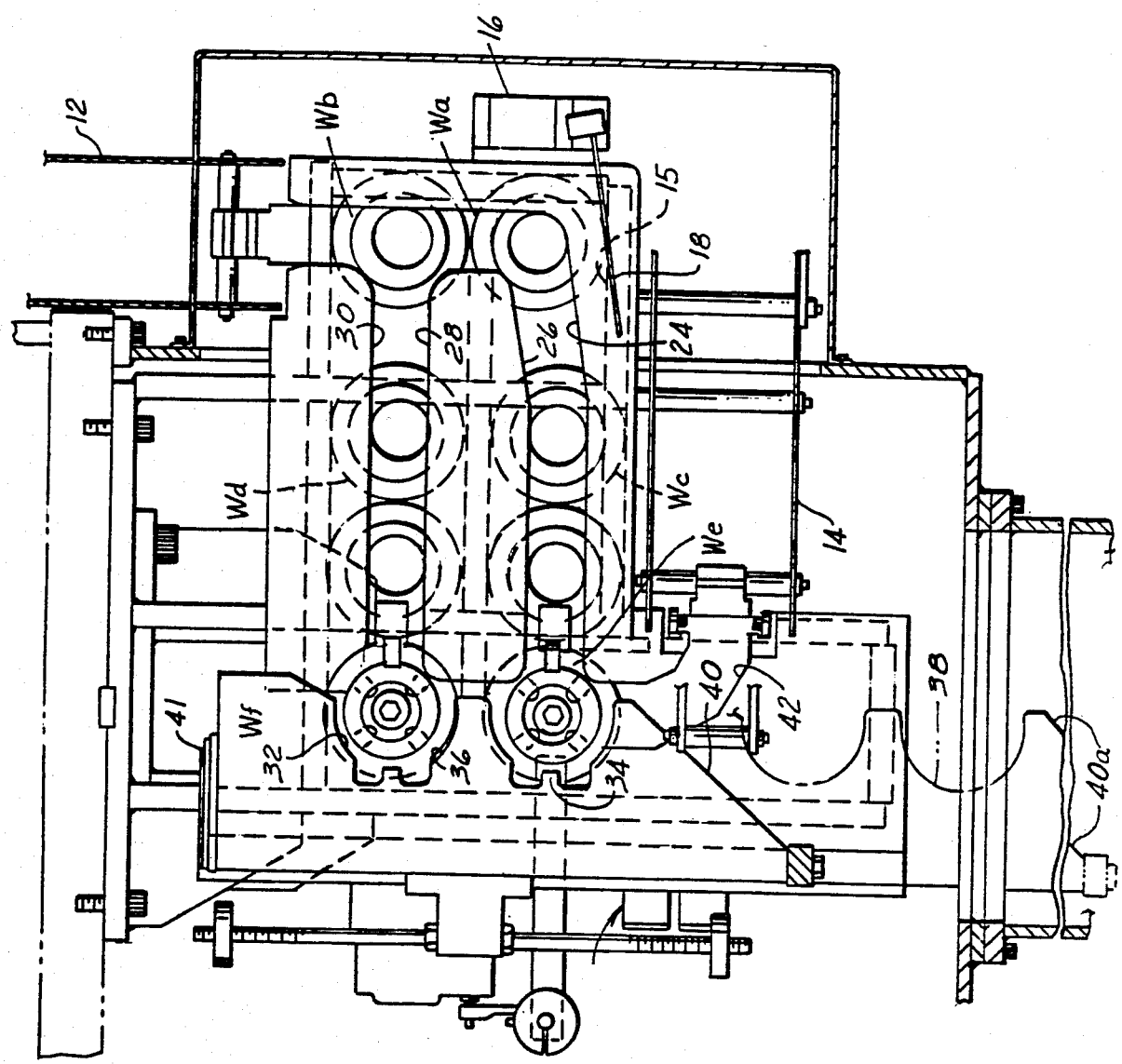
FIG. 4 is a fragmentary plan view as seen in the direction of arrows 4—4, FIG 1.
Figure 5:
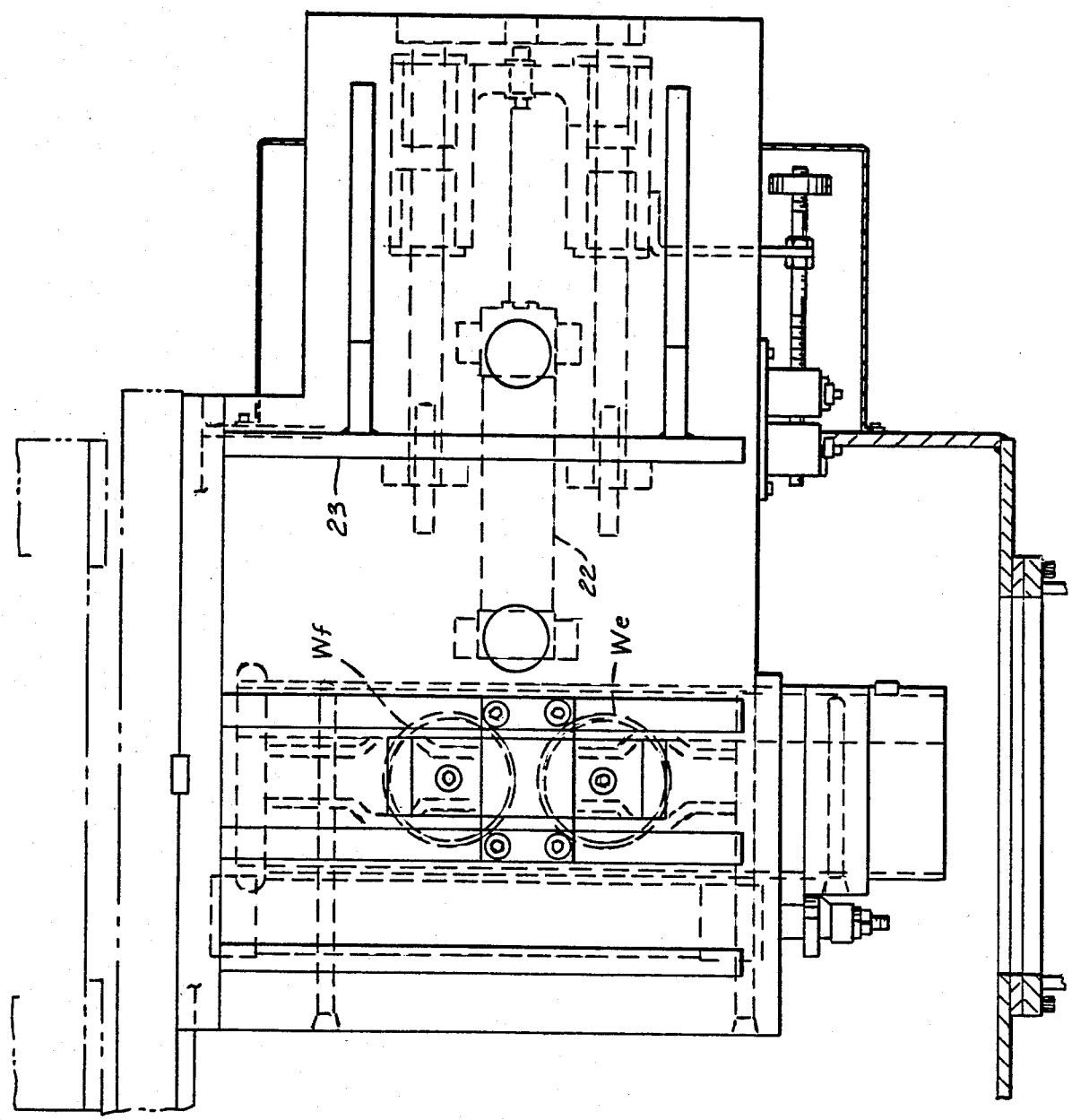
FIG. 5 is a further fragmentary plan view of other parts of the machine.

The machine comprises a frame 10 provided with an inchute, a portion of which is seen at 12 in FIG. 4. The particular workpieces chosen for illustration herein are generally designated at W, but are further designated at different positions by the letter W with a lower case letter following, as for example the workpiece or parts Wa, which is the leading part in the inchute 12, as seen in FIG. 4.

This figure also shows a portion of the outchute 14 over which finished workpieces are discharged from the machine. The inchute and outchute are conventional inclined chutes over which the parts move in tandem, with the peripheries of the heads in engagement in the inchute 12.

Figure 6:
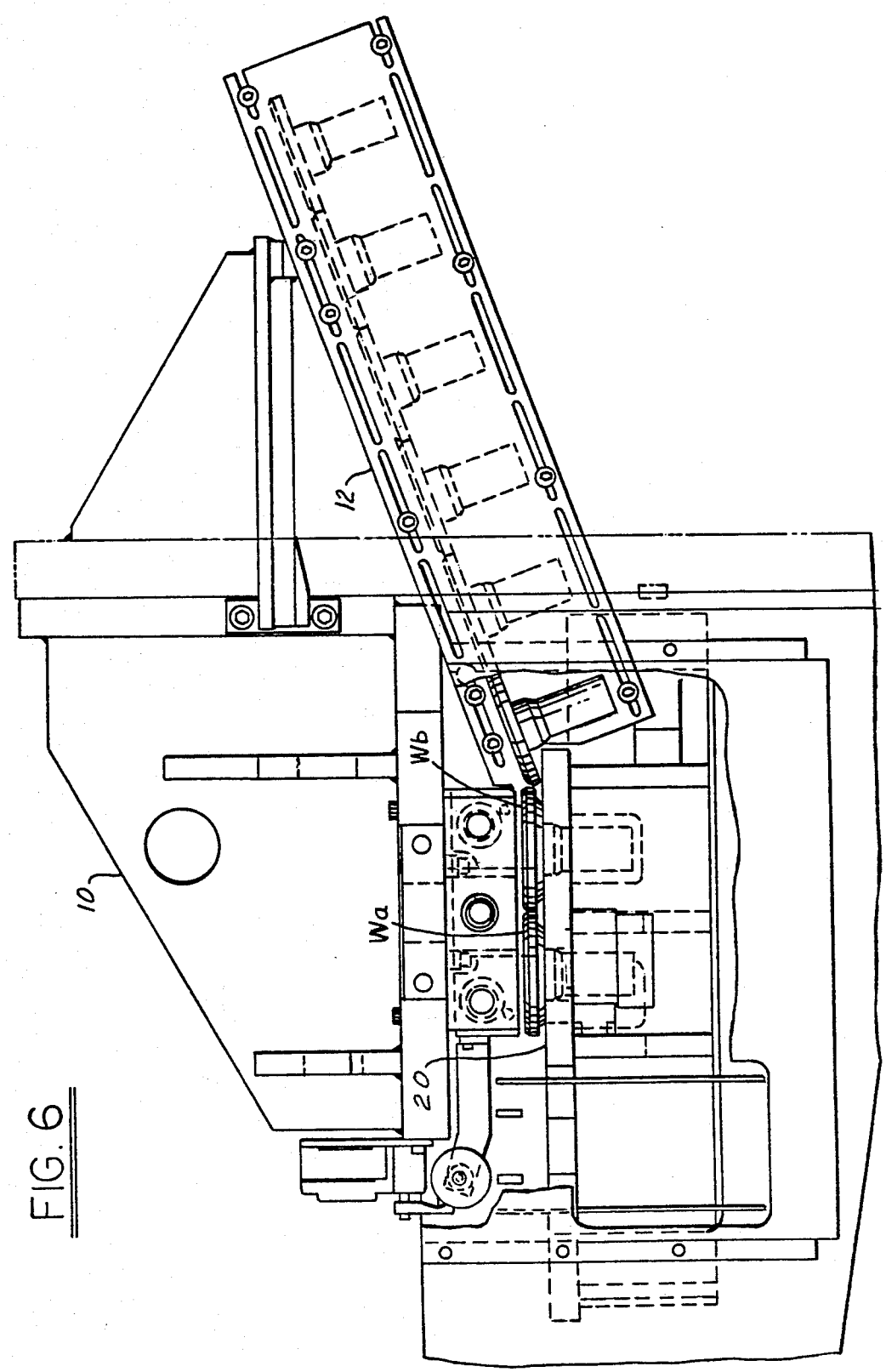
FIG. 6 is partial side view illustrating advance of parts W into the machine.

As seen in FIG. 4, the leading part Wa has engaged stop surface 15 and has actuated a limit switch 16 by engaging an arm 18, thus signalling that parts Wa and Wb are horizontally in position for advancement out of the preliminary loading position illustrated toward broaching position, as will be described. As best seen in FIG. 6, the two leading parts Wa and Wb from inchute 12 are positioned on horizontal rails 20 which engage under the heads at the upper ends of parts W.

A loader cylinder 22 is provided with a pusher 23 which advances parts Wa and Wb along the divergent paths defined by guide surfaces 24, 26, 28 and 30 to separate the initially abutting parts Wa and Wb to the laterally spaced positions seen at Wc and Wd in FIG. 4. As seen in this figure, a plurality of parts are advanced along the spaced paths, the intermediate parts advancing the foremost parts We and Wf horizontally into approximately located positions determined by locating surfaces 32, 34 and 36 which define laterally open recesses indicated generally at 38 in an elongated longitudinally movable loading and unloading bar 40 actuated by piston and cylinder device 41.

The parts W are moved upwardly from positions We to Wf as will subsequently be described, and are then returned to these positions. Bar 40 is then traversed horizontally to the dotted line position 40a (downwardly in FIG. 4), and the finished parts are cammed out of recesses 38 by cam surface 42 which engages the depending stems of the parts and deposits them in the outchute 14.

It will be observed that the parts W advance single file or in tandem to the machine, and are discharged therefrom in the same condition. This permits placement of the machine in a line of other machines for performing other operations on the parts.

Figure 1:
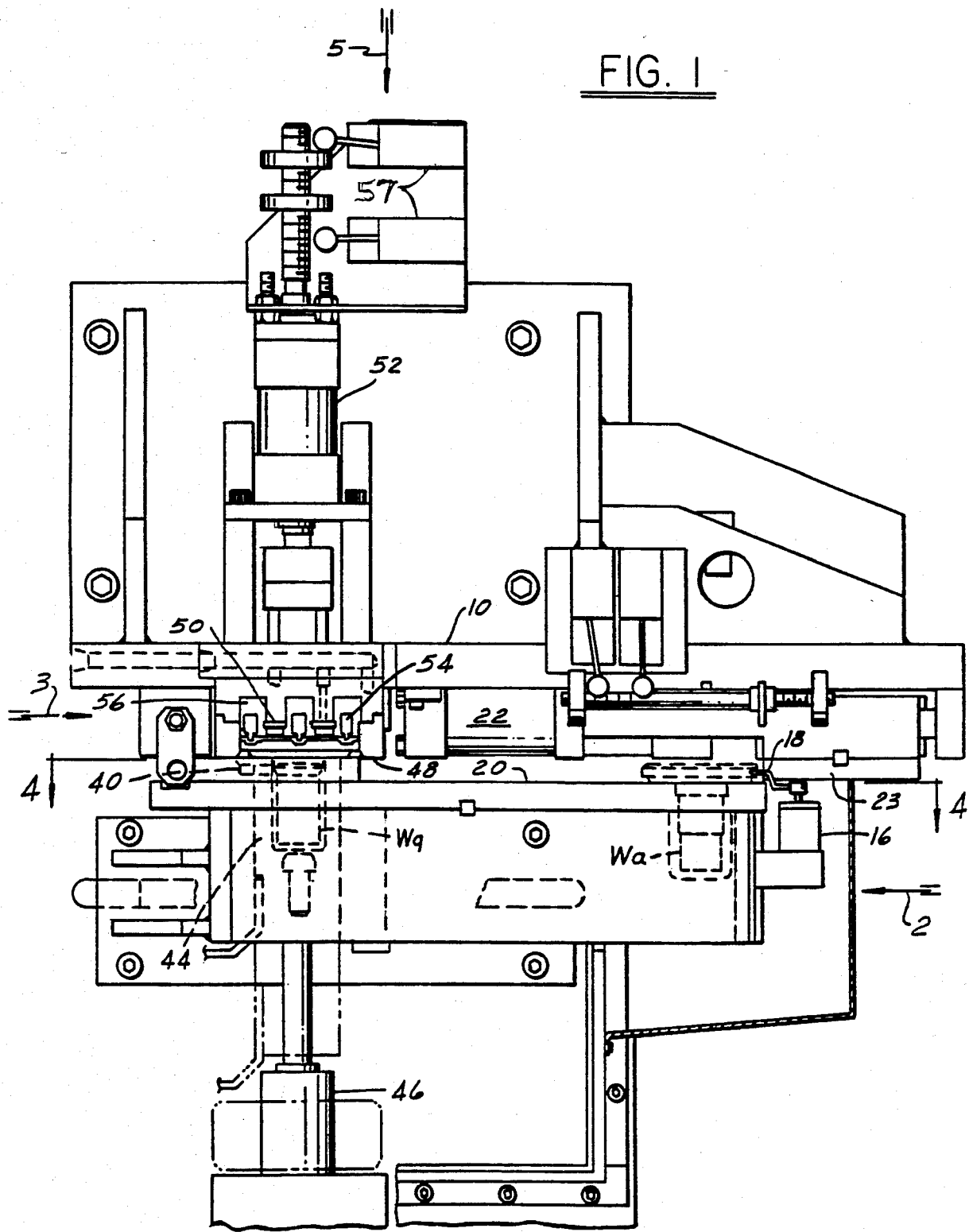
FIG. 1 is a fragmentary front elevation of the machine.
Figure 2:
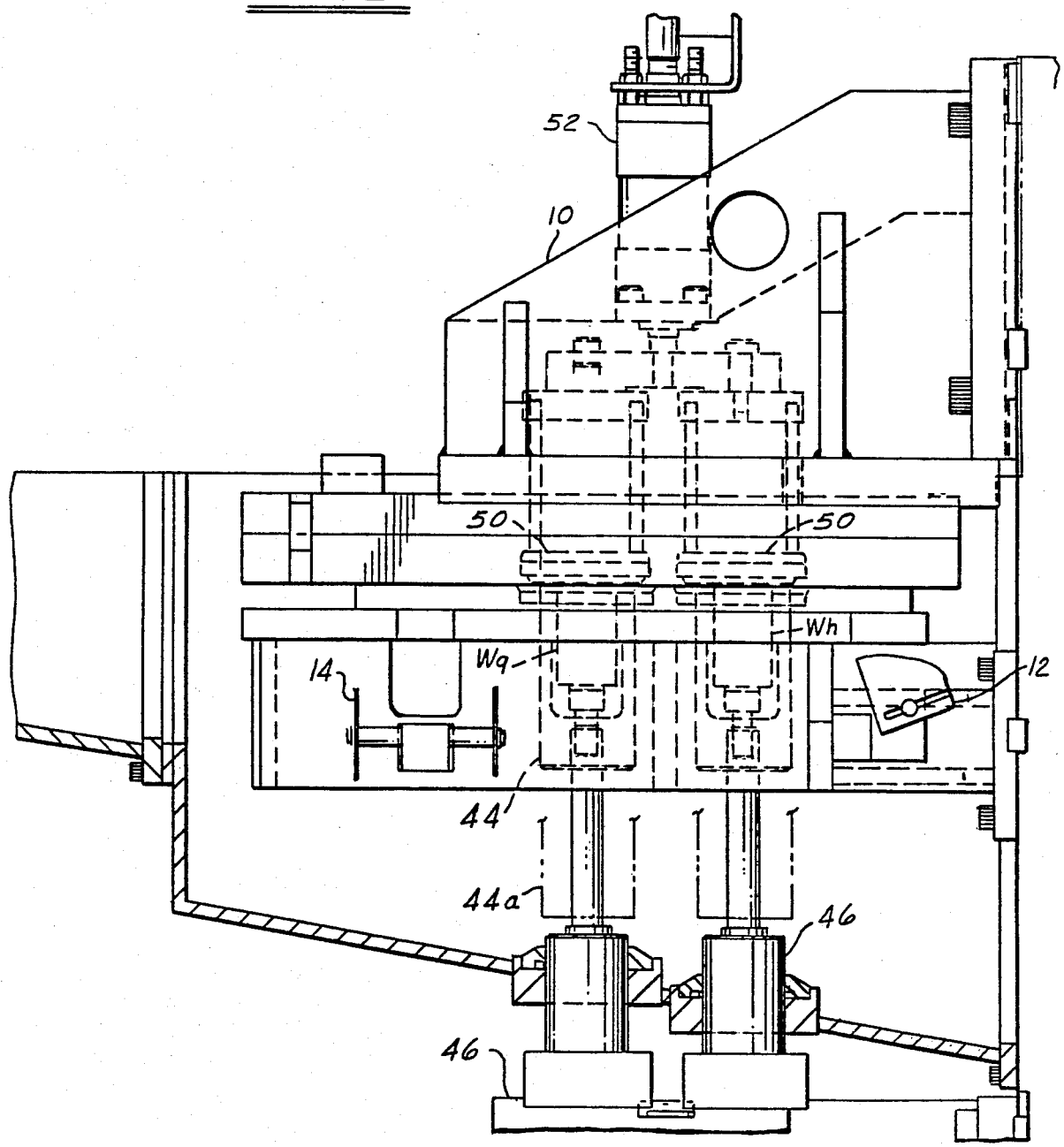
FIG. 2 is a fragmentary side view of the structure shown in FIG. 1, as seen from the right.

A pair of cup shaped clamps 44 are positioned for vertical movement beneath the two parts, We and Wf, and are actuated by piston and cylinder devices 46 from lower positions shown at 44a to the upper clamping positions in which the parts are raised to broaching positions indicated at Wg and Wh by engagement of upper annular clamping surfaces on clamps 44 with the undersides of the heads of the parts. At this time each of the parts Wg and Wh is accurately located in a stationary arcuate nest 48 (FIG. 1) and the vertical position of the parts is determined by vertically movable locating and ejections bars 50, connected to piston and cylinder device 52 which positions bars 50 in a precisely located vertical position to determine the depth of grooves to be broached therein. Nest 48, as best seen in FIG. 1 has downwardly facing inclined guide surfaces and the accurate location is provided by the inner arcuate locating surfaces thereof.

Accordingly, at the time of broaching the parts Wg and Wh are precisely located vertically and horizontally and in addition are solidly clamped between clamps 44 and bars 50.

Figure 3:
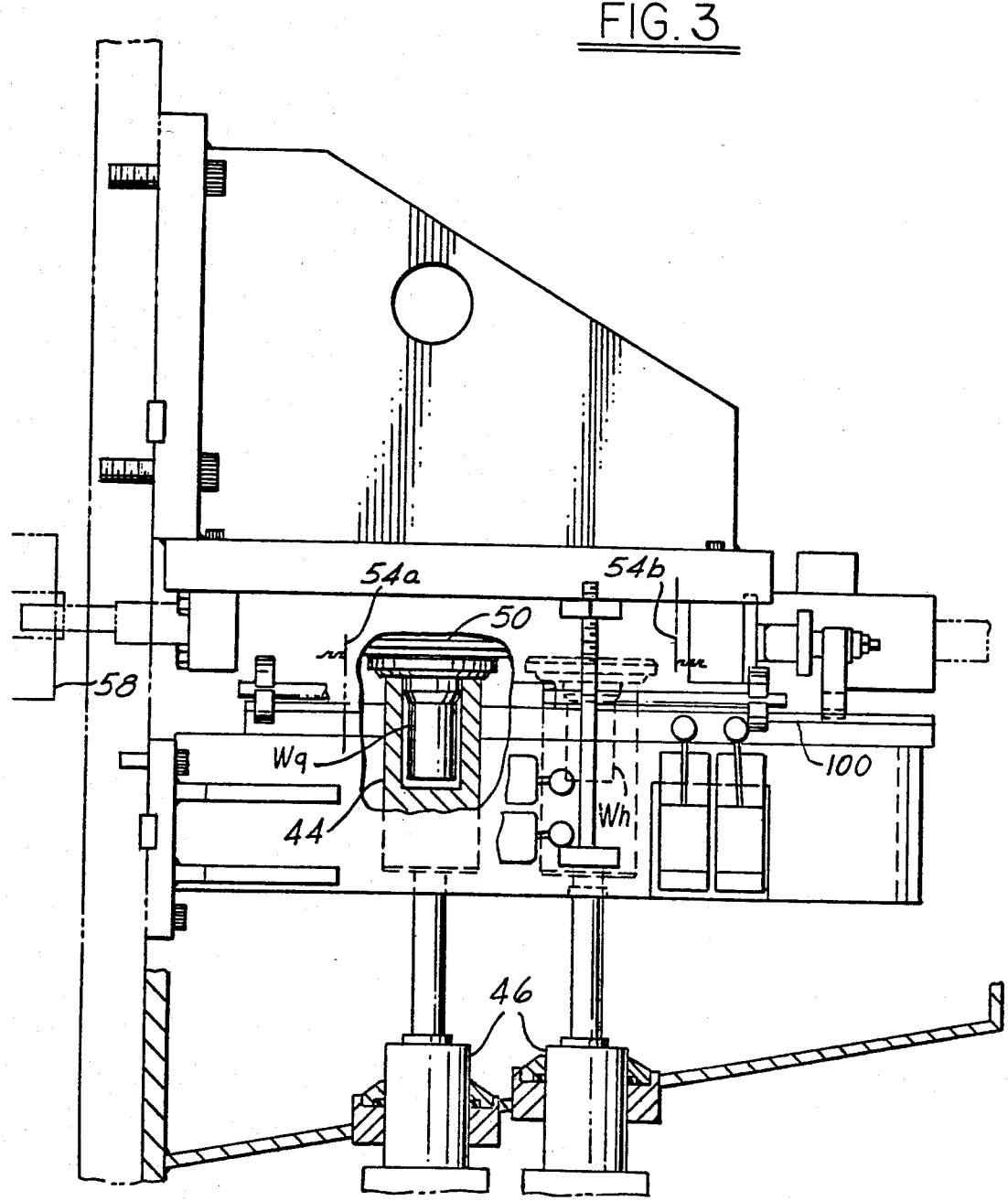
FIG. 3 is a fragmentary side view of the structure shown in FIG. 1, as seen from the left.

Elongated broaches 54 are mounted in holders 56 which are connected to a broach puller piston and cylinder device 58 (FIG. 3) which in the particular machine illustrated has a stroke of about 40" to advance the broaching bars 54 between limiting positions suggested in FIG. 3 at 54a and 54b.

After the broach slide has completed its cutting stroke (to the left in FIG. 3) piston 52 is energized to move locating and ejection bars 50 downwardly to move the pair of finished parts out of the nested positions Wg and Wh to their previous position, We and Wf in recesses in the loading and unloading bar 40. Bar 40 is then traversed to the left (downwardly in FIG. 4) to cam the finished parts into outchute 14.

It will of course be understood that the broaches may be returned to initial position as soon as the finished parts are moved downwardly by piston and cylinder device 52, whose operation is sensed by limit switches 57. A new pair of parts is advanced into the recesses of loading and unloading bar 40 when it is returned to initial position by its associated piston and cylinder device, whose motion is sensed by limit switches 59.

The machine as described is capable of very high production in a fully automatic operation. Assuming a ten second cycle, the machine will complete twelve parts per minute or seven hundred and twenty per hour. Moreover, the machine may be designed to handle more than two parts per cycle.

Essentially the operation may be described as one in which a plurality of parts are received in tandem alignment on a horizontal surface, and a plurality of parts are advanced from preliminary aligned loading position by pusher means on the horizontal surface into preliminary located aligned position. The parts are elevated by vertically movable clamps into accurately formed locating nests and against vertically movable locating and ejection members. At this time the parts are accurately located in horizontally aligned position and are firmly clamped for the broaching operation. The broaches are next traversed in a cutting stroke across the pair of parts in the direction of alignment thereof, cutting grooves therein. The locating and ejection members are now lowered to eject finished parts from the locating nests into the recesses in an unloading bar. This bar is then traversed, and the finished parts are cammed directly into the unloading chute. Parts in the inchute are advanced as soon as the pusher means is retracted.

I claim:

1. A broaching machine comprising a horizontal support surface, input means comprising an inchute in which a series of aligned abutting parts are advanced into preliminary loading position on said surface against stop means, feed means movable in a horizontal direction transverse to the array of aligned parts in preliminary loading position and engageable with selected ones of the parts to advance them horizontally toward preliminary located aligned positions, final horizontal locator means having accurate locating surfaces above the parts in preliminary located position to locate the parts in accurately located horizontally aligned positions, vertical locator means above said horizontal locator means having downwardly facing locating surfaces, vertically movable clamp means engageable with downwardly facing surfaces on the parts, means for raising said clamp means to elevate the parts into final located horizontally and vertically aligned position determined by said locating surfaces and to clamp the parts firmly in final located position for broaching, elongated broach means movable longitudinally across the parts in the direction of their horizontal alignment, means for lowering said clamp means to provide for return of the finished parts to preliminary aligned position, and discharge means for advancing the finished parts in the direction of alignment thereof into an outchute, in which the discharge means comprises an unloading bar having recesses for receiving the parts in preliminary located aligned position below the final accurately located broaching position of the parts, and means for moving said bar longitudinally after the parts have been returned from final broaching position into the recesses in said bar to advance the finished parts to said outchute.

2. A machine as defined in claim 1, in which said unloading bar has laterally open recesses into which the parts are advanced by said feed means, and cam means engageable by the finished parts as said unloading bar is moved longitudinally to cam the finished parts out of said recesses and into said outchute.

3. A machine as defined in claim 1, in which said final horizontal locator means has openings into which the parts are movable by said clamp means, said openings being shaped to expose upper surface portions of the parts for engagement by said vertical locator means.

4. A machine as defined in claim 3, in which said vertical locator means is vertically movable to determine the vertical position of the parts in final located position, and means for moving the vertical locator means from upper part locating position downwardly to eject the finished parts from said final horizontal locator means.

5. A machine as defined in claim 1, in which said final horizontal locator means has openings into which the parts are movable by said clamp means, said openings being shaped to expose upper surface portions of the parts for engagement by said vertical locator means.

6. A machine as defined in claim 5, in which said vertical locator means is vertically movable to determine the vertical position of the parts in final located position, and means for moving the vertical locator means from upper part locating position downwardly to eject the finished parts from said final horizontal locator means.

7. A machine as defined in claim 1, in which said vertical locator means comprise elongated locator bars, and said broach means comprises elongated broach bars, said locator and broach bars being alternated across the upper surfaces of the parts.

8. A machine as defined in claim 1, which comprises guide means defining diverging paths along which the parts are advanced from preliminary loading to preliminary located positions to provide separation between parts in preliminary located position.

9. The method of high production broaching of parts which comprises advancing a solid array of parts into a horizontally aligned preliminary loading position, advancing a selected plurality of parts horizontally toward horizontally aligned preliminary located position, elevating the selected plurality of parts from the horizontally aligned preliminary located position into final horizontally aligned broaching position while determining final horizontal and vertical alignment thereof, broaching upwardly facing surface portions of the parts by traversing elongated broach means longitudinally across the parts in the direction of horizontal alignment thereof, displacing the finish broached parts downward from final aligned broaching position to horizontally aligned preliminary located position, and discharging the finished parts by horizontal movement thereof in the direction of horizontal alignment thereof, in which the preliminary located position is determined by recesses in a longitudinally movable unloading bar, and discharge of the finished parts is provided by traversing said unloading bar longitudinally.

10. The method as defined in claim 9, which comprises advancing the leading ones of the horizontally aligned parts in preliminary loading position toward spaced apart but still horizontally aligned preliminary located position along divergent paths each occupied by a plurality of parts, whereby the leading parts in each of said paths are positioned in preliminary located position upon movement of the leading ones of the parts from preliminary loading position toward preliminary located position.

* * * * *